United States Patent [19]

Nagata et al.

[11] 4,098,841
[45] Jul. 4, 1978

[54] THERMOPLASTIC COPOLYMERS AND PREPARATION THEREOF

[75] Inventors: Nobuyoshi Nagata, Hirakata; Shu Taniguchi, Minoo, both of Japan

[73] Assignee: Nippon Paint Co., Ltd., Osaka, Japan

[21] Appl. No.: 553,191

[22] Filed: Feb. 26, 1975

Related U.S. Application Data

[63] Continuation of Ser. No. 84,944, Oct. 28, 1970, which is a continuation of Ser. No. 781,681, Oct. 28, 1968, abandoned, which is a continuation of Ser. No. 333,197, Dec. 24, 1963, abandoned.

[30] Foreign Application Priority Data

Dec. 23, 1963 [CA] Canada .............................. 891961/63

[51] Int. Cl.² ............................................. C08L 63/00
[52] U.S. Cl. ................................. 260/837 R; 260/836
[58] Field of Search ................................. 260/836, 837

[56] References Cited

U.S. PATENT DOCUMENTS

| | | | |
|---|---|---|---|
| 3,256,226 | 6/1966 | Fekete | 260/836 |
| 3,377,406 | 4/1968 | Newey | 260/836 |
| 3,432,478 | 3/1969 | May | 260/836 |
| 3,697,619 | 10/1972 | Nagata | 260/836 |

FOREIGN PATENT DOCUMENTS 1,081,295  1/1964  United Kingdom.

*Primary Examiner*—Paul Lieberman
*Attorney, Agent, or Firm*—Beveridge, DeGrandi, Kline & Lunsford

[57] ABSTRACT

This disclosure concerns an organic solvent soluble thermoplastic copolymers and the preparation thereof, and more specifically, thermoplastic copolymers compositions comprising an organic solvent, resinous base copolymers having at least one unreacted epoxy radical and at least one unreacted carboxyl radical per molecule, and if necessary, a pigment. Said copolymers compositions are excellent in hardness, chemical resistance, solvent resistance, adhesiveness, and other properties, and can give various thermosetting copolymers and copolymers which form coatings upon air drying, depending on the types. Said compositions can be used as enamels, primers, and surfacers for coating metals, boards, and have other practical applications as adhesives, paper coating materials, sizing materials for fibers and the like.

16 Claims, No Drawings

THERMOPLASTIC COPOLYMERS AND PREPARATION THEREOF

This application is a continuation of application S.N. 84,944 filed Oct. 28, 1970, which in turn is a continuation of application S.N. 781,681, filed Oct. 28, 1968, and now abandoned. This latter application is a continuation of application S.N. 333,197, filed Dec. 24, 1963, now abandoned. The entire disclosures of these related, copending applications are relied upon and incorporated herein by reference.

This invention relates to copolymers and preparations thereof, said copolymers consisting of epoxy resin having the formula:

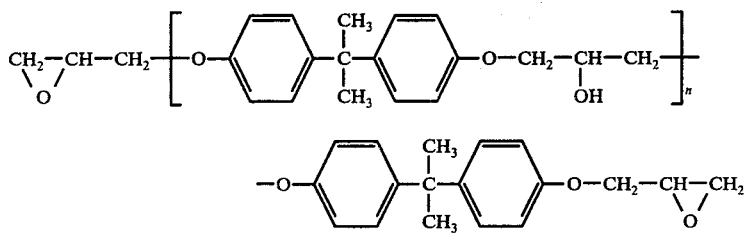

where $n = 0$ to 6, $\alpha,\beta$-ethylenically unsaturated carboxylic acid and polymerizable monomers, characterized by containing through copolymerization an epoxy resin structure in the molecule by the reaction of epoxy resin and $\alpha,\beta$-ethylenic unsaturated acid.

The object of the invention is to provide unique copolymers embodying the features of epoxy resin by either reacting epoxy resin of the structural formula as above referred to with $\alpha,\beta$-ethylenic unsaturated acid to form a product having one, two, or more $\alpha,\beta$-ethylenic unsaturated radicals and copolymerizing the product with copolymerizable monomers, or effecting the reaction of the acid radical of $\alpha,\beta$-ethylenic unsaturated acid with the epoxy radical and hydroxyl group of epoxy resin after, or simultaneously with, copolymerization of $\alpha,\beta$-ethylenic unsaturated acid with polymerizable monomers.

The thermoplastic copolymers obtained under the invention are excellent in hardness, chemical resistance, solvent resistance, adhesiveness, and other properties, and can produce various thermosetting copolymers and copolymers which form coatings upon air drying, depending on the types and quantities of $\alpha,\beta$-ethylenic unsaturated acid and vinyl monomers used and on the reactive conditions employed.

Also, with the addition of pigments such as titanium white, red oxide, Hansa Yellow, Cyanine Blue, fillers such as talc, clay, and calcium bicarbonate, the compounds according to the invention can be used as enamels, primers, and surfacers for the coating of metals, boards and other base materials, and they have other practical applications as adhesives, paper coating materials, sizing materials for fibers and the like.

The thermoplastic copolymers of the invention either contain the structure of epoxy resin or are chemically combined with epoxy resin having an unreacted epoxy radical as a side chain. This is one of the most important features of the invention. As a result, the unique properties of epoxy resin are incorporated into the copolymers, improving the chemical properties, particularly alkali-resistance, and adhesiveness, thermal resistance and other qualities of latter. Furthermore, when some monomers having functional groups capable of reacting with the epoxy, hydroxyl or carboxyl radicals, e.g. $\alpha,\beta$-ethylenic unsaturated acids, unsaturated alcohols, unsaturated amides, or their N-methylol derivatives are contained among copolymerization constituents, it is possible that the copolymers form, upon heating, cross links among the molecules, thereby attaining further improved qualities.

While it has hitherto been the practice to prepare a mixture of a copolymer having a functional group capable of reacting with epoxy resin as above mentioned, with epoxy resin, for use as coatings and the like, the copolymers according to the invention have features which distinguish them from the conventional products. As above described, the copolymers under the invention have unique characters themselves with the superior properties above referred to because they contain the structure of epoxy resin within their skeleton, whereas ordinary copolymers are unable in the least to have their qualities improved by being simply mixed with epoxy resin. The difference is particularly pronounced in applications where the coatings are dried in air. Moreover, in the case of setting with heat, the copolymers merely admixed with epoxy resin utilize the latter as the cross-linking agent, while those of the invention are readily hardened because they are capable of direct intermolecular reaction. Thus, the copolymers produced by the process of the invention can be set faster and more readily, and hence require shorter hardening time or lower hardening temperature, making it possible advantageously to use simpler thermosetting conditions for forming coated films.

One of the processes for obtaining the thermoplastic copolymers of the invention is described hereunder. The process is carried out in two stages. For convenience of illustration, acrylic acid or methacrylic acid is used as the $\alpha,\beta$-ethylenic unsaturated acid. The first stage comprises in the reaction of epoxy resin with acrylic acid or methacrylic acid. The epoxy resin to be used at this stage may be of any known type having the formula:

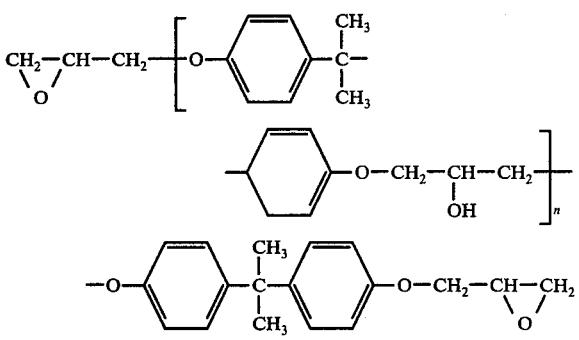

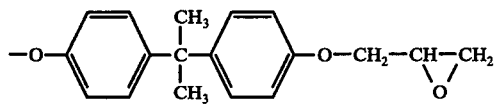

where $n = 0$ to 6.

The shape and properties of this series of compounds above mentioned depend largely on their degree of condensation polymerization, and, accordingly, the compositions of the invention which are the copolymers based on said constituent can have widely different properties. An epoxy resin with a low degree of condensation polymerization has consequently a low molecular weight and limited benzene nuclei derived from bisphenol A and hydroxyl groups in the molecule, while one with a higher degree of polymerization has a higher molecular weight and more benzene nuclei and hydroxyl groups. A comparison of properties between copolymer based on epoxy resins of small and large molecular weights has proved that the former has a tendency of forming a coating excellent in bending and boiling-water resistance, whereas the latter tends to give a coating having particularly good alkali-resistance. Today, epoxy resins made of bisphenol A - epichlorohydrine condensate polymers are sold by Shell Chemical Co. under the trade name of Epon and also by Ciba Pharmaceutical Co. under the trade name of Araldite. Epon, for example, is available in several types in the following structural formula with $n$ ranging from 0 to 12. For the compositions of the invention, however, it is preferable that $n$ is 0 to 6.

as acrylonitrile and methacrylonitrile; unsaturated alcohols, such as allyl alcohol and methallyl alcohol; unsaturated amides and their methylol derivatives and their alkyl ethers, such as acrylamide, methacrylamide, N-methylol acrylamide, N-methylol methacrylamide and alkyl ethers of N-methylol acrylamide and N-methylol methacrylamide; and $\alpha,\beta$-ethylenic unsaturated acid mentioned above as a secondary constituent.

The quantitative relations among the constituents of the copolymers of the invention are described hereunder.

When the copolymers of the invention are made by the two-stage process as described above, epoxy resin and $\alpha,\beta$-ethylenic unsaturated acid are indispensable constituents in the first stage, whereas in the second stage, the essential component on which the copolymer of the invention is based is a polymerizable epoxy derivative formed in the first stage. Depending on whether the polymerizable epoxy derivative formed in the first stage is a monovinyl compound, or di- or more polyvinyl compound, or a suitable mixture of those vinyl compounds, the combinations of types and quantities of polymerizable monomers, and, where necessary, those of $\alpha,\beta$-ethylenic unsaturated acid, to be copolymerized with said epoxy derivative may be varied in numerous ways.

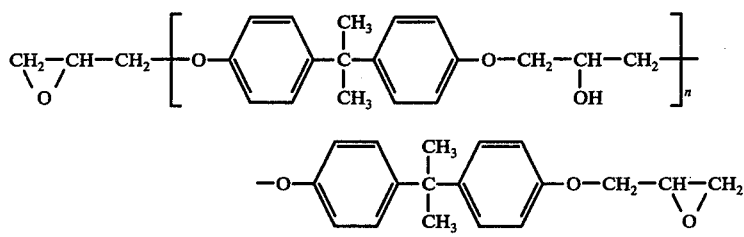

The secondary constituent for use under the invention is an acid which reacts with epoxy resin to form a compound having a polymerizable unsaturated group. Typical of such an acid is acrylic acid or methacrylic acid. Crotonic acid, maleic acid, maleic anhydride, fumaric acid, 3-butenonic acid, angelic acid, tiglic acid, and the like may be employed as well.

As the third constituent, polymerizable monomers which can be used singly or in combination of two or more monomers include: esters of organic acids, such as methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, dodecyl acrylate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, ethyl tiglate, vinyl acetate, vinyl propionate, vinyl butyrate, vinyl isobutyrate, isopropenyl acetate, and dimethyl fumarate; monoolefinic and diolefinic hydrocarbons and their halides, such as butadiene, 1,3-styrene, chlorostyrene and $\alpha$-methyl styrene; vinyl ethers, such as vinyl ethyl ether, and vinyl-2-ethylhexyl ether; unsaturated nitriles, such By way of example, in the first stage, epoxy resin is reacted with acrylic acid or methacrylic acid in such amounts that there contains one mol of the carboxyl group per two mols of the epoxy group, and then the reaction product is copolymerized with acrylic acid or methacrylic acid and another polymerizable monomer, in such a manner that throughout the first and second reaction systems there exists one mol of the carboxyl group per mol of the epoxy group. In this case, however, it is hardly possible that one mol of the carboxyl group completely reacts with two mols of the epoxy group in the first stage. As a result, much is left unreacted, and it is considered unlikely that the residues are completely reacted during the subsequent thermosetting step when they are heated at 140° to 150° C for about 30 minutes. Furthermore, the carboxyl residue may exert adverse effects on the chemical properties of the coating compositions, or, even if the reaction is achieved to a great extent, formation of a fairly large amount of polyvinyl compound also accompanies the reaction. In view of these considerations, it is advisable in practice to use acrylic acid or methacrylic acid in the first stage within a range of 0.5 to 2.0 mols of the carboxylic group thereof per mol of the epoxy group of the epoxy resin. The quantitative relations may be illustrated in terms of the ratio by weight in case where the bisphenol A-epichlorohydrine condensate polymer with $n = 0 - 6$ as above referred to. Then, in the first stage, 45.0 to 97.5 parts by weight of epoxy resin is reacted with 2.5 to 55.0 parts by weight of $\alpha,\beta$-ethylenic unsaturated acid with heat, and in the second stage, it is possible, to copolymerize 0.1 to 50.0 parts by weight of the polymerizable epoxy resin derivative formed in the first stage. Further, in terms of the composition of the copolymer formed, the product consists of 0.05 to 40.0 parts by weight of epoxy resin, 0.05 to 10.0 parts by weight of $\alpha,\beta$-ethylenic unsaturated acid, and 50.0 to 99.9 parts by weight of a polymerizable monomer. The same copolymer composition is applicable to a product by a process as above described whereby the reaction of epoxy resin and $\alpha,\beta$-ethylenic unsaturated acid is effected after or simultaneously with the copolymerizing reaction thereof, the composition being freely modified within the range above defined. Of the polymerizable monomers useful to the invention, those having functional groups capable of reacting with the epoxy, hydroxyl or carboxyl radical of the polymerizable epoxy resin derivative produced in the first stage may be selected. They include, for example, unsaturated alcohols such as allyl alcohol and methallyl alcohol, unsaturated amides or their methylolized derivatives such as acrylamide, methacrylamide, N-methylolized acrylamide, and N-methylolized methacrylamide. A process hitherto known in this regard is to first copolymerize acrylamide with methacrylamide, and then to methylolize the copolymer formed as above with formaldehyde or the like. Even if an epoxy resin derivative having two polymerizable unsaturated groups in a molecule is formed in the first stage, selection of suitable types and quantities of a polymerizable monomer, polymerization solvent, and polymerization regulator makes it possible to carry out graft polymerization thereof in the second stage, thereby to produce a copolymer of a polymerizing epoxy resin derivative within a range of 0.1 to 50.0 parts by weight without any possibility of gelling. The more the quantity of the polymerizing epoxy resin derivative, the more the copolymer produced has the properties of the epoxy resin. Hence, the coated film of the copolymer obtained can have the characteristic features as described earlier, even upon air drying. This explains another important significance of the process of the invention whereby epoxy resin is reacted beforehand with $\alpha,\beta$-ethylenic unsaturated acid, instead of simply mixing epoxy resin in a copolymer as is usual.

The polymerization solvent for use in the second stage may be any of the solvents usually employed, including: aromatic hydrocarbons such as benzene, toluene, and xylene; esters of acetic acid such as methyl acetate, ethyl acetate, and butyl acetate; ketones such as methyl ethyl ketone, methyl isobutyl ketone, and acetone; alcohols such as methanol, ethanol, propanol, and butanol; cyclic ethers such as dioxane, acetonitriles and the like. Either a single solvent or a mixture of two or more selected from the list may be used according to the composition to be polymerized.

The invention is illustrated by the following examples:

EXAMPLE 1

(First stage)

In a reaction vessel equipped with a stirrer, a thermometer and a reflux cooler (reactors of the same combination were employed in all the following examples), 420 parts by weight of Epon 828 (epoxide equivalent weight = 180–195; made by Shell Chemical Co.), 86 parts by weight (1.195 equivalent) of acrylic acid, 169 parts by weight of xylene, and 0.0173 part by weight of hydroquinone were mixed and dissolved. The ratio of equivalents of epoxy to equivalents of acid was 1.81 to 1.95. The solution was subjected to a reaction under reflux at 140° C for 2 hrs. The acid values before and at the conclusion of the reaction were, respectively, 102 and 70; the percent reduction in acid value is 31.2%.

(Second stage)

The reactor of the same type as used in the first stage was provided with a calibrated dropping funnel (reactors of the same combination were used throughout the second stages in the following examples). Into the reaction vessel, a mixture solution of 52 parts of ethyl acetate and 209 parts of toluene, all by weight, was placed, heated to 100° C, and refluxed with stirring. Next, a mixture solution of the following composition was introduced into a reaction vessel over two hours:

| First-stage product | 42.3 | parts by weight |
| Acrylic acid | 5.4 | parts by weight |
| Methyl methacrylate | 100.0 | parts by weight |
| Ethyl acrylate | 135.0 | parts by weight |
| Benzoyl peroxide | 1.36 | parts by weight |

After the addition of the above mixture, 1.50 parts by weight of lauryl mercaptan was added to the reaction system and the reaction was carried out for 3 hrs. At the end of the reaction, 0.0564 part by weight of hydroquinone was mixed in and dissolved thoroughly in the reaction product, and the product was stored.

The resin produced was almost colorless and transparent, and was viscous (the reading of a viscosimeter made by Tokyo Shibaura Electric Co. was Z), with an acid value of 14.4. The resin was suitably diluted with xylene, applied to an iron plate, and baked at 140° C for 30 min. The coated film was beautiful and lustrous in appearance, had extremely good resistance to boiling water and bending. It also possessed satisfactory water and gasoline resistance.

EXAMPLE 2

(First stage)

A mixture solution of 450 parts by weight of Epon 1001 (epoxide equivalent weight = 425 – 550; made by Shell Chemical), 43 parts by weight (0.5 equivalents) of methacrylic acid, 211 parts by weight of xylene, and 0.0086 part by weight of hydroquinone were reacted under reflux. The ratio of equivalents of epoxy to equivalents of acid was 1.64 to 2.12. The reflux was started at 130° C, when acid value of the mixture was 41. 5.5 hrs. later, the acid value was decreased to 30, when the reaction was terminated. The reduction in acid value was 26.8%.

(Second stage)

In a reaction vessel, 38 parts by weight of ethyl acetate, 152 parts by weight of toluol, and 0.573 part by weight of lauryl mercaptan were mixed and heated to the boiling point of the mixture. Next, a mixture solution of the following composition was introduced into the vessel over one hour, and then 0.093 part by weight hydroquinone was dissolved in the reaction product for storing:

| First-stage product | 65.6 | parts by weight |
| Methyl methacrylate | 60.0 | parts by weight |
| Ethyl acrylate | 81.0 | parts by weight |
| Benzoyl peroxide | 0.953 | parts by weight |

A baked coating of the above product formed under the same conditions as in Example 1 was fairly superior to the similar coated film of the preceding example in hardness and alkali-proof quality. After immersion in an aqueous 5% sodium hydroxide solution for 100 hrs., it remained unchanged. Although the product was rather inferior in bending resistance, it had very good resistance to gasoline.

The viscosity and acid value of the resin were Z and 13.3, respectively, or substantially the same as in Example 1.

Another advantage of the resin is that it can be readily sprayed for coating, and thus facilitates handling and coating operation.

EXAMPLE 3

(First stage)

The same procedure as in Example 2 was followed, excepting that the reaction was further continued until the acid value dropped to 20. The reduction in acid value was 51.3%.

(Second stage)

The reaction temperature and time as well as the procedure was the same as in Example 2. The composition of the materials was as follows:

| Ethyl acetate | 32.6 | parts by weight |
| Toluol | 130.5 | parts by weight |
| Lauryl mercaptan | 0.816 | parts by weight |
| First-stage product | 19.7 | parts by weight |
| Methacrylic acid | 1.3 | parts by weight |
| Methyl methacrylate | 63.0 | parts by weight |
| Ethyl acrylate | 84.0 | parts by weight |
| Benzoyl peroxide | 0.816 | parts by weight |

Upon completion of the reaction, 0.033 part by weight of hydroquinone was added to the product for stabilizing purpose. The resin produced had a low viscosity of Q and a low acid value of 4.9. Like the product in the preceding example, it had very good workability, being readily coated by spraying.

A baked film thereof prepared in the same manner as in Example 1 had properties generally same as that of Example 2, but was more resistant to alkali. It remained inert when immersed in an aqueous 5% sodium hydroxide solution for 12 days. Its resistance to boiling water was rather less satisfactory.

EXAMPLE 4

(First stage)

Entirely the same procedure as in Example 1 was followed.

(Second stage)

A mixture of 33 parts by weight of ethyl acetate, 133 parts by weight of toluol, and 0.50 part by weight of lauryl mercaptan was placed in a reaction vessel, and was heated to 100° C. To the mixture, a monomeric mixture solution of the following composition was added over one hour. The reaction was carried out for another 5 hrs. under reflux. Then the reaction product was stored with the addition of 0.034 part by weight of hydroquinone.

| First-stage product | 33.7 | parts by weight |
| Acrylic acid | 4.3 | parts by weight |
| Methyl methacrylate | 52.5 | parts by weight |
| Ethyl acrylate | 76.5 | parts by weight |
| Styrene | 7.8 | parts by weight |
| Acrylamide | 1.1 | parts by weight |
| Benzoyl peroxide | 0.833 | parts by weight |

The resin obtained was slightly yellowish and transparent. Its viscosity was Z, and acid value, 19.2.

A white enamel was prepared with a diluted solution of 130 parts by weight of the above resin in 15 parts by weight of xylol, 5 parts by weight of ethyl acetate, and 15 parts by weight of Cellosolve acetate, blended with 32 parts by weight of titanium white. The white enamel was suitably diluted with xylol, and sprayed to form a coated film. When baked at 140° C. for 30 min., the film had good luster, skin appearance, and hardness, which remained unchanged when the film was immersed in boiling water for 2 hrs. Also, it had good bending resistance, passing a 2 mm diameter bending test. When the white enamel was poured on an iron plate and dried at room temperature, it remained unaffected by exposure in the outdoors, and retained the good luster and other features.

EXAMPLE 5

(First stage)

A mixture of 210 parts by weight of Epon 828, 43 parts by weight of acrylic acid, 109 parts by weight of xylol, and 0.0216 part by weight of hydroquinone was dissolved in a reaction vessel, and the mixture was reacted under reflux for 5 hrs. The reaction temperature changed from 135° C to 144° C, and the acid value from 91 to 51. The rate of reaction was 45 percent.

(Second stage)

A mixture of the following composition was placed in a reaction vessel:

| First-stage product | 10.8 | parts by weight |
| Acrylic acid | 7.5 | parts by weight |
| Methyl methacrylate | 141.0 | parts by weight |
| Ethyl acrylate | 84.0 | parts by weight |
| Styrene | 60.0 | parts by weight |
| Toluol | 160.7 | parts by weight |
| Lauryl mercaptan | 2.25 | parts by weight |

The mixture was heated with agitation until it began boiling at 106° C. Then, a mixture solution of 4.5 parts by weight of benzoyl peroxide and 36.0 parts by weight of toluol was introduced dropwise into the mixture over 2.5 hrs. The mixture was further reacted under reflux at the boiling point for another 2.5 hrs. period. Finally, 100.0 parts by weight of toluol was added to the reaction product.

A comparison was made of the properties of the coated films made of three types of the product, namely, the resin (A) obtained in the foregoing manner, the resin (B) formed of the same composition excepting the first-stage product, by the same procedure and under the same reacting conditions as in the case of the resin (A), and a resin (C) consisting of the resin (B) in mixture with 1.1% (by weight) of Epon 828.

Each test specimen of white enamel consisted of 150 parts by weight of the resin formed, 50 parts by weight of titanium white, and 40 parts by weight of toluol. The specimens were applied to iron plates by spraying and dried at room temperature or with heat. The result of the property test was as tabled below:

|  |  | Dried at room temp. for 48 hrs. | | | Dried at 140° C for 30 min. | | |
|---|---|---|---|---|---|---|---|
| Property tested | | Type of Resin | | | | | |
|  |  | A | B | C | A | B | C |
| Hardness [1] | | 12 | 12 | 12 | 24 | 25 | 25 |
| Erichsen test [2] | | 8.9 | 9.3 | 9.1 | 2.0 | 1.1 | 1.1 |
| Adhesiveness [3] | | 100/100 | 100/100 | 100/100 | 100/100 | 95/100 | 92/100 |
| Alkali resistance (2% NaOH) | Immersed for 5 hrs. | No. change | Swells largely. Delustered slightly. Noticeably swells & is delustered. | Swells largely. Delustered slightly. Noticeably swells & is delustered. | No change | No change | No change |
|  | Immersed for 30 hrs. | Slightly swells. Negligibly delustered. |  |  | No change | Little changed. | No change |

[1] Values determined by a Sword Rocker hardness meter.
[2] Values in mm until the film crack.
[3] Numbers left by cross cutting 100 pcs. at intervals of 1 mm.
[4] The quantity of Epon 828 contained in C equaled to that contained in A.

It will be apparent from the above result that the copolymerized resins of the invention are extremely alkali-proof when dried naturally, and can have improved adhesiveness and tenacity upon drying with heat.

EXAMPLE 6

(First stage)

The same procedure as in Example 5 was followed.

(Second stage)

The procedure followed was substantially same as in Example 5, except that lauryl mercaptan was removed from the composition of materials, the quantity of toluol was increased to 402 parts by weight, the quantities of benzoyl peroxide and toluol subsequently added were 6.0 and 48.0 parts by weight, respectively, and that they were added over a period of 3 hrs.

The resin produced contained 40% of involatile substances, meaning that the reaction rate was almost 100%.

A white enamel consisting of 188 parts by weight of the resin obtained as above and 50 parts by weight of titanium white was applied to iron plates by spraying. The coated film had the following properties which were substantially same as those of Example 5:

|  | Drying condition | |
|---|---|---|
|  | At room temp. for 48 hrs. | At 140° C for 30 min. |
| Hardness | 12 | 26 |
| Erichsen test | 9.1 | 1.2 |
| Adhesiveness | 100/100 | 100/100 |
| Alkali-resistance (2% NaOH) | No change for 5 hrs. | No change for 48 hrs. |

EXAMPLE 7

(First stage)

180 parts by weight of Epon 1001 (epoxide equivalent weight = 425–550), 10 parts by weight of maleic anhydride, and 127 parts by weight of xylol were mixed and dissolved, reacted at the boiling point of the mixture under reflux for 2 hrs. The ratio of equivalents of epoxide to equivalents of anhydride was 1.61 to 2.08. The reaction temperature changed from 131° C to 140° C, and the acid value from 19 to 11. The percent reduction in acid value was 42%. Upon completion of the reaction, 63 parts by weight of ethyl acetate was added to the product.

(Second stage)

A reaction vessel was charged with a mixture of the following compositions:

| First-stage product | 30.0 | parts by weight |
|---|---|---|
| Acrylic acid | 6.0 | parts by weight |
| Methyl methacrylate | 138.0 | parts by weight |
| Ethyl acrylate | 82.5 | parts by weight |
| Styrene | 58.5 | parts by weight |
| Toluol | 149.0 | parts by weight |
| Lauryl mercaptan | 3.0 | parts by weight |

With application of heat, the mixture began to boil at 97° C, when a mixture solution of 4.5 parts by weight of benzoyl peroxide and 36.0 parts by weight of toluol was added over 2.5 hrs. Then, the reaction was effected further for 3 hrs. at the boiling point of the mixture. A viscous resin with a polymerization degree of 100% was produced.

Coated films of a white enamel consisting of 150 parts by weight of the resin obtained as above, 60 parts by weight of titanium white, and 20 parts by weight of toluol were as given in the following table:

|  | Drying condition | |
|---|---|---|
|  | At room temp. for 48 hrs. | At 140° C for 30 min. |
| Hardness | 14 | 25 |
| Erichsen test | 9.1 | 1.7 |
| Adhesiveness | 100/100 | 100/100 |
| Alkali-resistance | Slight swelling after immersion for 5 hrs. | No change after immersion for 48 hrs. |

EXAMPLE 8

(First stage)

The same as in Example 5.

(Second stage)

Into a reaction vessel, a mixture of the following composition was introduced, and heated. After it began to boil at 98° C, a solution consisting of 7.1 parts by weight of benzoyl perchloride and 56 parts by weight of toluol was added to the reaction system over 3.5 hrs.

Then, the reaction was continued for further 2 hrs. at the boiling point of the mixture.

| | | |
|---|---|---|
| First-stage product | 12.7 | parts by weight |
| Methyl methacrylate | 123.9 | parts by weight |
| Ethyl acrylate | 84.0 | parts by weight |
| Styrene | 31.2 | parts by weight |
| Acrylonitrile | 23.9 | parts by weight |
| Acrylamide | 10.7 | parts by weight |
| Toluol | 128.0 | parts by weight |
| Lauryl mercaptan | 4.2 | parts by weight |

Thereafter, the temperature was lowered to about 80° C, and 6.1 parts by weight of p-formaldehyde (effective constituent-88%), 28.3 parts by weight of dioxane, 65.9 parts by weight of toluol, and 2.5 parts by weight of triethylamine were added, and then the mixture was heated. The reaction was carreid out for 2 hrs. at the boiling point of the mixture. During the reaction, the temperature increased from 102° C to 109° C. Upon completion of the reaction, the temperature was lowered, and 62.8 parts by weight of n-butyl alcohol was added.

A white enamel consisting of 167 parts by weight of the resin produced as above, 50 parts by weight of titanium white, and 23 parts by weight of toluol was applied to an iron plate by spraying, and baked at 140° C for 20 min. The coated film had the following properties:

| | |
|---|---|
| Hardness | 20 |
| Erichsen test | 1.7 |
| Adhesiveness | 100/100 |
| Alkali resistance (2% NaOH) | No change after immersion for 72 hrs. |
| Gasoline resistance | No change after immersion for 24 hrs. |
| Water resistance | No change after immersion for 120 hrs. |

EXAMPLE 9

(First stage)

A mixture of 210 parts by weight of Epon 828, 43 parts by weight of acrylic acid, and 0.0216 part by weight of hydroquinone was caused to react in a reaction vessel at 140° C for 2 hrs. During the course of the reaction, the acid value decreased from 121 to 44, indicating a reaction rate of 64%.

(Second stage)

A mixture of the following composition was placed in a reaction vessel, and was heated.

| | | |
|---|---|---|
| First-stage product | 42.2 | parts by weight |
| Acrylic acid | 2.2 | parts by weight |
| Methyl methacrylate | 43.5 | parts by weight |
| Ethyl acrylate | 26.7 | parts by weight |
| Styrene | 18.5 | parts by weight |
| Toluol | 111.8 | parts by weight |
| Lauryl mercaptan | 2.0 | parts by weight |

As the temperature of the charge reached 80° C, a solution consisting of 1.8 parts by weight of benzoyl peroxide and 14.0 parts by weight of toluol was added to the reaction mixture over a period of 2 hrs. The temperature was kept at about 85° C throughout the period. Upon completion of the adding, the reaction was terminated. Involatile contents of the product one hour after the start of the reaction and of the product after completion of the reaction were determined, and also coated films of the products dried at 100° C for 60 min. were tested for general properties. The results were as tabled below:

| | Reaction time | |
|---|---|---|
| | 1 hr. | 2 hr. |
| Involatile content | 20% | 28% |
| First-stage product | 16% | 16% |
| Copolymer based on other monomers | 4% | 12% |
| Properties | Opaque, viscous, and fail to form perfect film. | Forms transparent and hard film. Soft, and flexible Good adhesiveness and alkali-resistance. |

From the above result, it is apparent that, one hour after the start of the reaction, the copolymerization is yet to take place, while two hours afterwards, the copolymerization of the first-stage product and monomers is considerably in progress. Upon removal of the unreacted monomers, the product in the latter stage may be used as a copolymer.

In the foregoing examples, the percent reduction in acid number ranges from at least 26.8% up to about 64%. When the epoxy resin is Epon 828 and the acid is acrylic acid, the percent reduction in acid value ranges from at least 31.2% up to about 64%. When the epoxy resin is Epon 1001 and the acid is methacrylic acid, the percent reduction in acid value ranges from at least 26.8% up to about 51.3%.

What is claimed is:

1. A process for preparing an organic solvent soluble copolymer having at least one unreacted epoxy radical and at least one unreacted carboxyl radical per molecule, said process comprising a first step of reacting an epoxy resin of the formula:

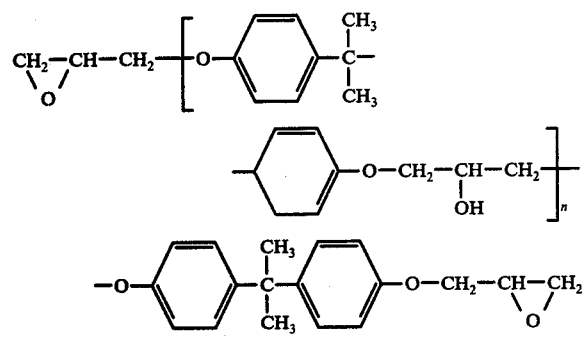

where $n = 0$ to 6, with an $\alpha$, $\beta$-ethylenically unsaturated carboxylic acid or an acid anhydride while heating at 120° to 200° C until the epoxy resin is reacted to such an extent that there is a decrease in acid value between the start of the first step and the conclusion of the first step of at least 26.8% and up to about 64%; and a second step of copolymerizing in solution 0.1 to 31.7 parts by weight of the resulting reaction product with 68.3 to 99.9 parts by weight of at least one other copolymerizable monomer at a temperature lower than the heating temperature of the first step to form a resin, such that in said first step:

(a) said epoxy resin has an epoxide equivalent of 180–195 and said acid is acrylic acid in a ratio of 5 equivalents of epoxy to equivalents of acid of 1.81 to 1.95; or (b) said epoxy resin has an epoxide equivalent of 425–550 and said acid is methacrylic acid in a ratio of equivalents of epoxy to equivalents of acid of 1.64 to 2.12; or (c) said epoxy resin has an epoxide equivalent of 425–550 and said anhydride is maleic anhydride in a ratio of equivalents of epoxy to equivalents of anhydride of 1.61 to 2.08.

2. Process according to claim 1 wherein said first step reaction is carried out by heating at 140° to 160° C.

3. Process according to claim 2 wherein a polymerization inhibitor is employed in said first step to prevent polymerization of acrylic acid and methacrylic acid.

4. Process according to claim 3 wherein said polymerization inhibitor is selected from the group consisting of benzoquinone, hydroquinone, dinitrobenzene and α,α-diphenyl-β-picryl hydrazyl.

5. Process according to claim 3 wherein said polymerization inhibitor comprises 200 ppm hydroquinone relative to acrylic acid or methacrylic acid.

6. Process according to claim 1 wherein a chain transfer agent is employed in said second step.

7. Process according to claim 6 wherein said chain transfer agent is lauryl mercaptan, n-octyl mercaptan, thiophenol, carbon tetrachloride, or triethyl amine.

8. Process according to claim 1, which comprises either heating a mixture of (1) epoxy resin, (2) α,β-ethylenic unsaturated acid, and (3) polymerizable monomers, thereby to effect the reactions of (1) with (2), and (2) with (3), simultaneously, or first copolymerizing (2) and (3), and thereafter reacting the resulting copolymer with (1).

9. Process according to claim 1 wherein said other copolymerizable monomer is at least one monomer selected from the group consisting of methyl methacrylate, ethyl acrylate, styrene, acrylamide and acrylonitrile.

10. Process according to claim 1 wherein a polymerization solvent is employed in said second step, said solvent selected from the group consisting of benzene, toluene, xylene, methyl acetate, ethyl acetate, butyl acetate, methyl ethyl ketone, methyl isobutyl ketone, acetone, methanol, ethanol, propanol, butanol, dioxane and acetonitrile.

11. Process according to claim 1 wherein:

(a) said acid is acrylic acid, said decrease in acid value is 31.2 to 64% and said other copolymerizable monomer is methyl methacrylate, ethyl acrylate, styrene, acrylamide, acrylonitrile or mixtures thereof; or (b) said acid is methacrylic acid, said decrease in acid value is 26.8 to 51.3% and said other copolymeriz-able monomers are methyl methacrylate and ethyl acrylate; or (c) said anhydride is maleic anhydride, said reduction in acid number is 42% and said other copolymerizable monomers are methyl methacrylate, ethyl acrylate and styrene.

12. An organic solvent soluble copolymer having at least one unreacted epoxy radical and at least one unreacted carboxyl radical per molecule, said copolymer comprising the reaction product from a first step of reacting an epoxy resin of the formula:

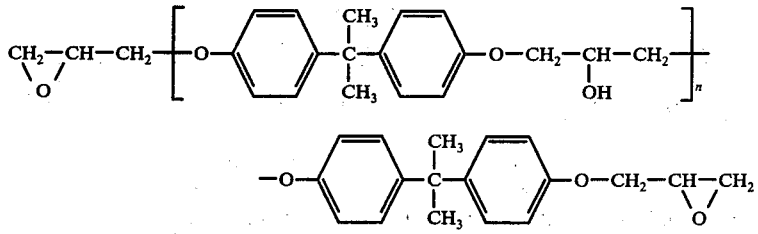
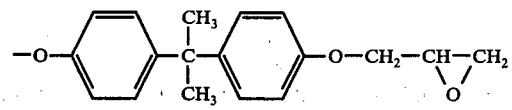

where n = 0 to 6, with an α,β-ethylenically unsaturated carboxylic acid or an acid anhydride while heating at 120° to 200° C until the epoxy resin is reacted to such an extent that there is a decrease in acid value between the start of the first step and the conclusion of the first step of at least 26.8% and up to about 64%; and a second step of copolymerizing in solution 0.1 to 31.7 parts by weight of the reaction product from the first step with 68.3 to 99.9 parts by weight of at least one other copolymerizable monomer at a temperature lower than the heating temperature of the first step to form said copolymer; such that in said first step:

(a) said epoxy resin has an epoxide equivalent of 180–195 and said acid is acrylic acid in a ratio of equivalents of epoxy to equivalents of acid of 1.81 to 1.95; or (b) said epoxy resin has an epoxide equivalent of 425–550 and said acid is methacrylic acid in a ratio of equivalents of epoxy to equivalents of acid of 1.64 to 2.12; or (c) said epoxy resin has an epoxide equivalent of 425–550 and said anhydride is maleic anhydride in a ratio of equivalents of epoxy to equivalents of anhydride of 1.61 to 2.08.

13. Copolymer according to claim 1 wherein:

(a) said acid is acrylic acid, said decrease in acid value is 31.2 to 64% and said other copolymerizable monomer is methyl methacrylate, ethyl acrylate, styrene, acrylamide, acrylonitrile or mixtures thereof; or (b) said acid is methacrylic acid, said decrease in acid value is 26.8 to 51.3% and said other copolymerizable monomers are methyl methacrylate and ethyl acrylate; or (c) said anhydride is maleic anhydride, said reduction in acid number is 42% and said other copolymerizable monomers are methyl methacrylate, ethyl acrylate and styrene.

14. Copolymer composition comprising an organic solvent, copolymers according to claim 12 and, if necessary, pigments.

15. Copolymer composition comprising an organic solvent, copolymers according to claim 13 and, if necessary, pigments.

16. Copolymer comprising the material obtained by drying the copolymer of claim 12 at a temperature of from room temperature to 160° C.

* * * * *